S. Taggart,
Flour Packer.
Nº 12,107.      Patented Dec. 19, 1854.

UNITED STATES PATENT OFFICE.

SAMUEL TAGGART, OF INDIANAPOLIS, INDIANA.

CLUTCH IN MACHINES FOR PACKING FLOUR.

Specification of Letters Patent No. 12,107, dated December 19, 1854.

*To all whom it may concern:*

Be it known that I, SAMUEL TAGGART, of Indianapolis, in the county of Marion and State of Indiana, have invented certain new and useful Improvements in Machines for Packing Flour; and I do hereby declare that the following is a full, clear, and exact description of the same, reference being had to the annexed drawings, making a part of this specification, in which—

Figure 1:
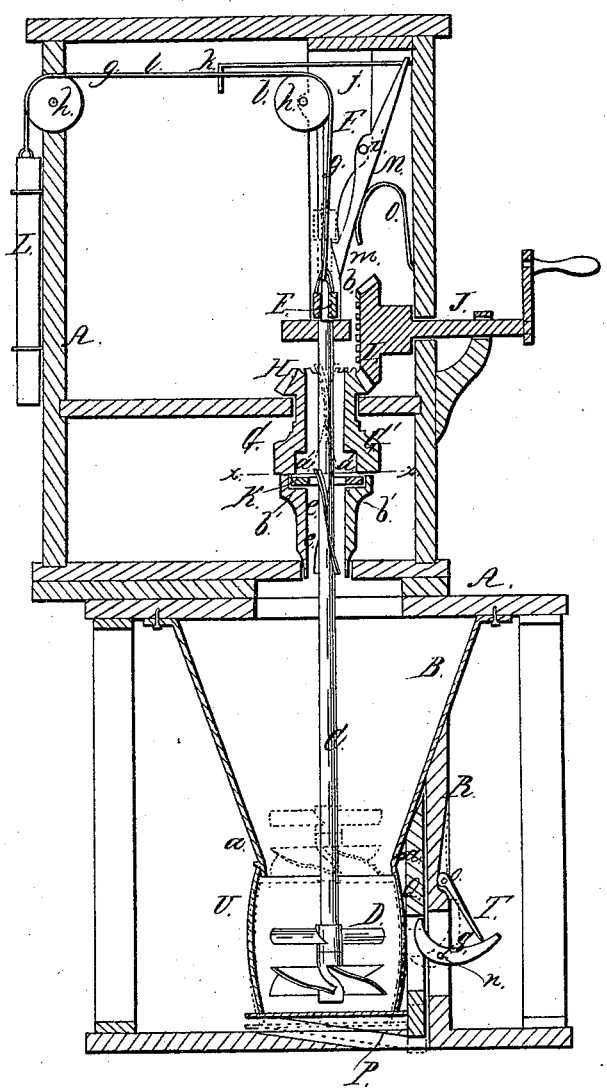
Figure 2:
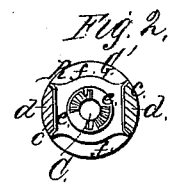

Figure 1, is a vertical section of my improved machine, the plane of section being through the center. Fig. 2, is a horizontal section of the clutch $(x)$, $(x)$, Fig. 1, being the line of section.

Similar letters of reference indicate corresponding parts in the two figures.

This invention relates to certain new and useful improvements in machines for packing flour, and consists, in the employment or use of a clutch constructed in a peculiar manner, as will be hereafter shown and described, whereby motion is communicated to the screw or packing shaft, and also a certain amount of pressure given to the screw.

To enable others skilled in the art to make and use my invention, I will proceed to describe its construction and operation.

A, represents the flour chest which may be of an inverted conical shape having its lower end provided with a flanch $(a)$, the use of which will be shown hereafter.

C, is the packing shaft which passes vertically through the flour chest B, and having at its lower end a spiral flanch or screw D, the diameter of which is of such a size as to fill the lower end or discharging aperture of the flour chest. The upper end of the packing shaft C, is inserted in a head E, which works or slides freely up and down in a frame F, at the upper part of the frame A. The upper part of the packing shaft passes entirely through the head E, and turns within it, and has a pin $(b)$, passing through it just above the head.

G, is a clutch formed of a hollow cylinder or thimble G', fitted in the frame A, so as to rotate, and having a horizontal beveled wheel H, at its upper end, which wheel H, gears into a beveled wheel I, hung at one end of a driving shaft J. K, is a collar which is fitted horizontally within the cylinder or thimble, and so attached to it as to slide or play vertically a short distance, but at the same time connected to the cylinder or thimble so as to turn with it at all times, see Fig. 2, in which the collar is shown connected to the cylinder or thimble by dovetail recesses $(c)$, $(c)$, which fit over corresponding projections $(d)$, $(d)$, on the inner sides of the cylinder or thimble. The shoulders $(a')$, $(a')$ $(b')$, $(b')$ between which the collar plays vertically, are shown in Fig. 1.

The packing shaft, C, passes through the cylinder of thimble G', and collar K, and has spiral flanches or ribs $(e)$, $(e)$ upon it within the cylinder or thimble. On the inner periphery of the collar K, there are two studs or nibs $(f)$, $(f)$, which bear against the spiral flanches or ribs $(e)$, $(e)$, on the packing shaft, as shown in Fig. 2. In Fig. 1, they are not seen as the plane of section cuts off one, and the other is behind the packing shaft.

To the upper end of the head E, a cord $(g)$, is attached, said cord passes over pulleys $(h)$, $(h)$, at the upper part of the frame A, and is attached to a bar or weight L, at the side of the frame A.

M, is a lever at the upper part of the frame A, and having its fulcrum at $(i)$, to the upper end of this lever is connected a bar $(j)$, the outer end of which is perforated with a hole through which a rod $(k)$, on the cord $(g)$, passes, the rod $(k)$, having a hook or eye $(l)$, at each end which cannot pass through the hole in the bar $(j)$. At the lower end of the lever M, there is a catch $(m)$, the use of which will be hereafter shown.

O, is a spring which acts against the lower end of the lever M, and keeps it out from the side of the frame A.

P, is a platform attached to sliding bar Q, which is placed vertically against a stationary beam or stud R, secured within the frame A. The sliding bar Q, is moved up and down by a lever S, which has its fulcrum at $(n)$, in the beam or stud R. The outer end of the lever S, is held down when desired by a pawl T, attached by a pivot $(o)$, to the beam or stud R.

Operation: The spiral flanch or screw D, previous to operating the machine, is at the bottom of the flour chest B, and fills the discharging aperture, the packing shaft being held up by the catch $(m)$ which is underneath the head E, see red lines Fig. 1. The flour chest B, is now filled, and the barrel to be packed with flour, represented by U, is placed upon the platform P, which is raised by depressing the lever S, the upper end of the barrel fitting over the discharging aperture of the flour chest and bearing against the flanch (a), the barrel being sustained in this position by the pawl T, the outer end of which rests against the outer end of the lever S. The lever M, is now operated by depressing the bar or weight L, and the catch (m), is thrown out from under the head E, the packing shaft then falls by its own gravity, and the screw D, reaches the bottom of the barrel. Motion is now given the driving shaft J, and the cylinder or thimble G′, is made to rotate by the gearing H, I, and as the collar K, turns with the cylinder or thimble, the studs or nibs (f), (f), on the inner periphery of the collar act against the spiral flanches or ribs (e), (e), on the packing shaft C, and cause it to rotate, said packing shaft, as it rotates, ascending upward in consequence of the screw D, which packs the flour in the barrel as it ascends. A certain pressure is given the screw in consequence of the studs or nibs (f), (f), of the collar acting against the spiral flanches or ribs (e), (e), and the packing shaft, the ribs and spiral flanches having a tendency to bear the packing shaft downward. The spiral flanches of course move upward within the cylinder or thimble G′, and cause the collar to bear against the upper shoulders (a′), in the cylinder or thimble, and when the lower end of the spiral flanches just pass above the studs or nibs (f), (f), on the collar K, the catch (m), at the lower end of the lever M, passes underneath the head E, and the collar K, falls upon the lower shoulders (b′), in the cylinder or thimble G′, and the packing shaft ceases to rotate, the cylinder or thimble still rotating, its motion being constant. The barrel is now removed by throwing the pawl T, out from the lever S, which causes the platform P to descend. A fresh or empty barrel is then placed upon the platform, and the operation above described, repeated.

The above machine works well in practice, and is portable and economical to manufacture. The spiral flanches or ribs (e), (e), render the weighting of the shaft, to obtain the necessary pressure upon the screw, unnecessary, and the manner of raising and lowering the barrel works far better than the lever which is now employed, and which acts upon the barrel with a curvilinear friction, and requiring much space for its operation.

I do not claim the spiral flanch or screw D, separately for packing flour, for that has been previously used, neither do I claim a clutch for communicating motion to the packing shaft, irrespective of the peculiar construction and arrangement of the one herein shown and described.

What I claim therefore, and desire to secure by Letters Patent, is:—

The employment or use of the clutch G, formed of a cylinder or thimble G′, provided with a collar K, as shown, and having studs or ribs (f), (f), on its inner periphery, which studs or nibs act against spiral flanches or nibs (e), (e), on the packing shaft C, said cylinder or thimble having a constant rotating motion given it. The several parts of the clutch being otherwise constructed, arranged and operating in the manner and for the purpose as herein set forth.

SAMUEL TAGGART.

Witnesses:
 WM. SULLIVAN,
 WILLIAM HADLEY.